United States Patent [19]

Ito

[11] Patent Number: 4,989,075

[45] Date of Patent: Jan. 29, 1991

[54] SOLID-STATE IMAGE SENSOR DEVICE

[75] Inventor: Yukinobu Ito, Tochigi, Japan

[73] Assignee: Kabushiki Kaisha Toshiba, Kawasaki, Japan

[21] Appl. No.: 517,385

[22] Filed: Apr. 30, 1990

Related U.S. Application Data

[63] Continuation of Ser. No. 370,074, Jun. 23, 1989, abandoned, which is a continuation of Ser. No. 236,390, Aug. 24, 1988, abandoned.

[30] Foreign Application Priority Data

Aug. 26, 1987 [JP] Japan ................................ 62-210284

[51] Int. Cl.$^5$ ................................................ H04N 9/04
[52] U.S. Cl. .......................................... 358/41; 358/43; 358/213.11
[58] Field of Search ...................... 358/44, 41, 48, 43, 358/42, 213.11, 75, 80

[56] References Cited

U.S. PATENT DOCUMENTS

| | | |
|---|---|---|
| Re 31,200 | 4/1983 | Sukonick et al. |
| 3,678,497 | 7/1972 | Watson et al. |
| 4,069,511 | 1/1978 | Lelke |
| 4,080,622 | 3/1978 | Sugihara ........................ 358/44 |
| 4,205,389 | 5/1980 | Heartz |
| 4,243,984 | 1/1981 | Ackley et al. |
| 4,267,573 | 5/1981 | Chaikin et al. |
| 4,356,482 | 10/1982 | Oguchi |
| 4,364,090 | 12/1982 | Wendland |
| 4,414,628 | 11/1983 | Abuha et al. |
| 4,453,177 | 6/1984 | Berger ........................ 358/48 |
| 4,460,919 | 7/1984 | Takemura ........................ 358/44 |
| 4,489,389 | 12/1984 | Beckwith et al. |
| 4,496,944 | 1/1985 | Collmeyer et al. |
| 4,500,915 | 2/1985 | Koike ........................ 358/44 |
| 4,550,315 | 10/1985 | Bass et al. |
| 4,573,080 | 2/1986 | Maze |
| 4,709,259 | 11/1987 | Suzuki ........................ 358/44 |
| 4,710,803 | 12/1987 | Suzuki ........................ 358/43 |
| 4,758,883 | 7/1988 | Kawahara ........................ 358/41 |
| 4,814,865 | 3/1989 | Tabei et al. ........................ 358/44 |

*Primary Examiner*—Edward L. Coles, Sr.
*Assistant Examiner*—Jerome Grant, II
*Attorney, Agent, or Firm*—Finnegan, Henderson, Farabow, Garrett and Dunner

[57] ABSTRACT

A solid-state image sensing device comprises photoelectric image sensors disposed in parallel with each other for receiving an optical image, vertical transfer members coupled to the image sensors, and horizontal transfer members coupled to output of the vertical transfer members. The vertical transfer members are each formed of R, G and B vertical transfer arrays provided for R, G and B color image signals output from a photoelectric image sensor. Outputs of the R, G and B vertical transfer arrays are coupled to R, G and B horizontal transfer arrays. The R, G and B vertical transfer arrays store the R, G and B image signals, and transfer the stored R, G and B image signals to the R, G and B horizontal transfer arrays.

19 Claims, 3 Drawing Sheets

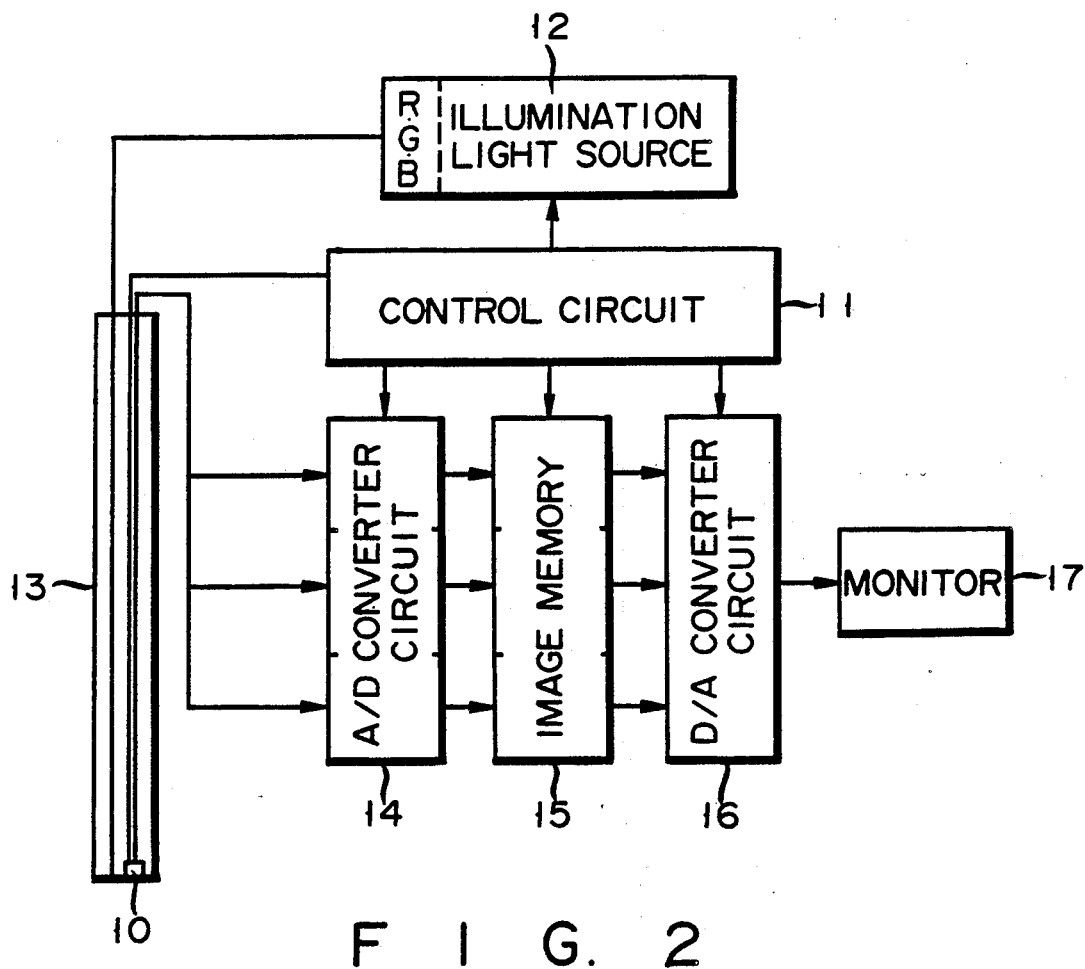
F I G. 2
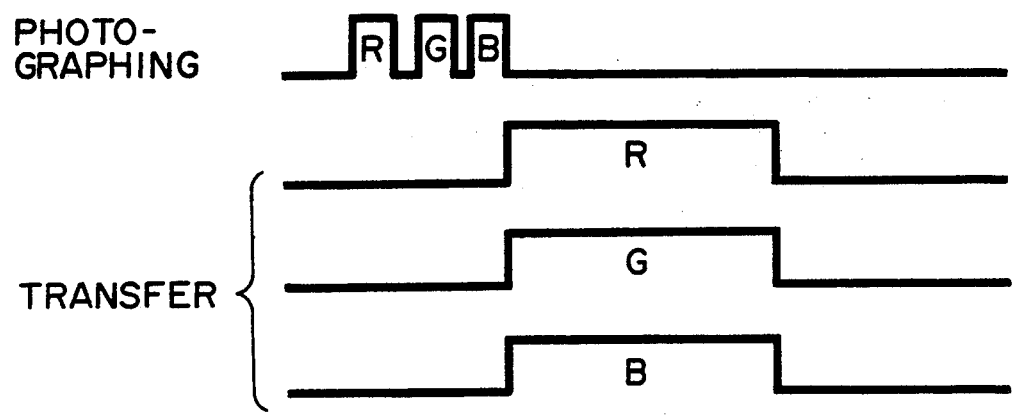
F I G. 3

SOLID-STATE IMAGE SENSOR DEVICE

This application is a continuation, of application Ser. No. 07/370,074, filed June 23, 1989, which is a continuation of application Ser. No. 07/236,390, filed Aug. 24, 1988, now abandoned.

BACKGROUND OF THE INVENTION

1. Field of the Invention

The present invention relates to a solid-state image sensing device.

2. Description of the Related Art

To photograph a scene in colors using a solid-state image sensor, a plurality of color images of the scene are taken by the solid-state image sensor to produce a plurality of image signals corresponding to the color images. The image signals are synthesized to produce a television-type color image signal. Being exposed to an optical image through color filters of three primary colors of red (R), green (G) and blue (B), for example, the solid-state image sensor converts the optical image to three image signals corresponding to R, G and B. The image signals are synthesized and applied to a color television monitor, thereby displaying a color image of the scene.

In conventional solid-state image sensors, a plurality of photoelectric conversion members, each formed of a large number of photoelectric elements vertically arranged, are arrayed in parallel in the horizontal direction, and vertical transfer members are disposed adjacent to and in parallel with the respective photoelectric conversion members. The photoelectric conversion members each convert an incident optical image to an electric signal, and the vertical transfer members each store photoelectric signals from a corresponding photoelectric conversion member and sequentially transfer the photoelectric signals in the vertical direction. A horizontal transfer member is provided below the array of the vertical transfer members to store the photoelectric signals transferred from the vertical transfer members and to sequentially transfer the photoelectric signals in the horizontal direction.

With the conventional color solid-state image sensors, three color filters of R, G and B are attached to three consecutive photoelectric conversion members, respectively, and photoelectric signals from the three photoelectric conversion members are synthesized to form a color image signal. Thus, three photoelectric conversion members are needed to obtain an image for a vertical column, lowering the resolution of the whole image obtained by the solid-state image sensor.

As an alternative to the above system, a plane-sequential system is known. In this system, a light source adapted for emitting R, G and B light is switched to sequentially emit the R, G and B light for illumination of a scene, and three-color photoelectric signals sequentially output from the solid-state image sensor are synthesized to produce a color image signal. According to this system, since a photoelectric conversion member can produce a color image signal corresponding to one vertical column, the resolution will not be degraded. With this system, however, since three images of R, G and B are sequentially taken to obtain a color image, color dislocations would occur in the resultant image. Further, when the subject is a rapidly moving subject, R, G and B images are displaced to one another.

SUMMARY OF THE INVENTION

It is an object of the present invention to provide a solid-state image sensing device capable of alleviating the reduction in resolution of reproduced images, the reduction in image quality and color dislocations in the reproduced images.

According to the present invention, a vertical transfer member coupled to a photoelectric conversion member is formed of a plurality of transfer arrays allotted for a plurality of color signals, respectively, and the transfer arrays are sequentially selected to store the corresponding color signals. The color signals stored in the transfer arrays are transferred sequentially or simultaneously.

More specifically, according to the present invention, three vertical transfer arrays are provided for three primary colors of R, G and B and switched each time a color signal of R, G and B is received from the photoelectric conversion member. Therefore, the R, G and B color signals output from the photoelectric conversion member can be stored in corresponding vertical transfer arrays within a short time. The color signals stored in the vertical transfer arrays may be transferred to a horizontal transfer member sequentially or simultaneously.

BRIEF DESCRIPTION OF THE DRAWINGS

FIG. 2 is a block diagram of a device in which the solid-state image sensing device of the invention is applied to an endoscope;

FIG. 3 is a timing diagram of the device of FIG. 2; and

DETAILED DESCRIPTION OF THE PREFERRED EMBODIMENT

Figure 1:
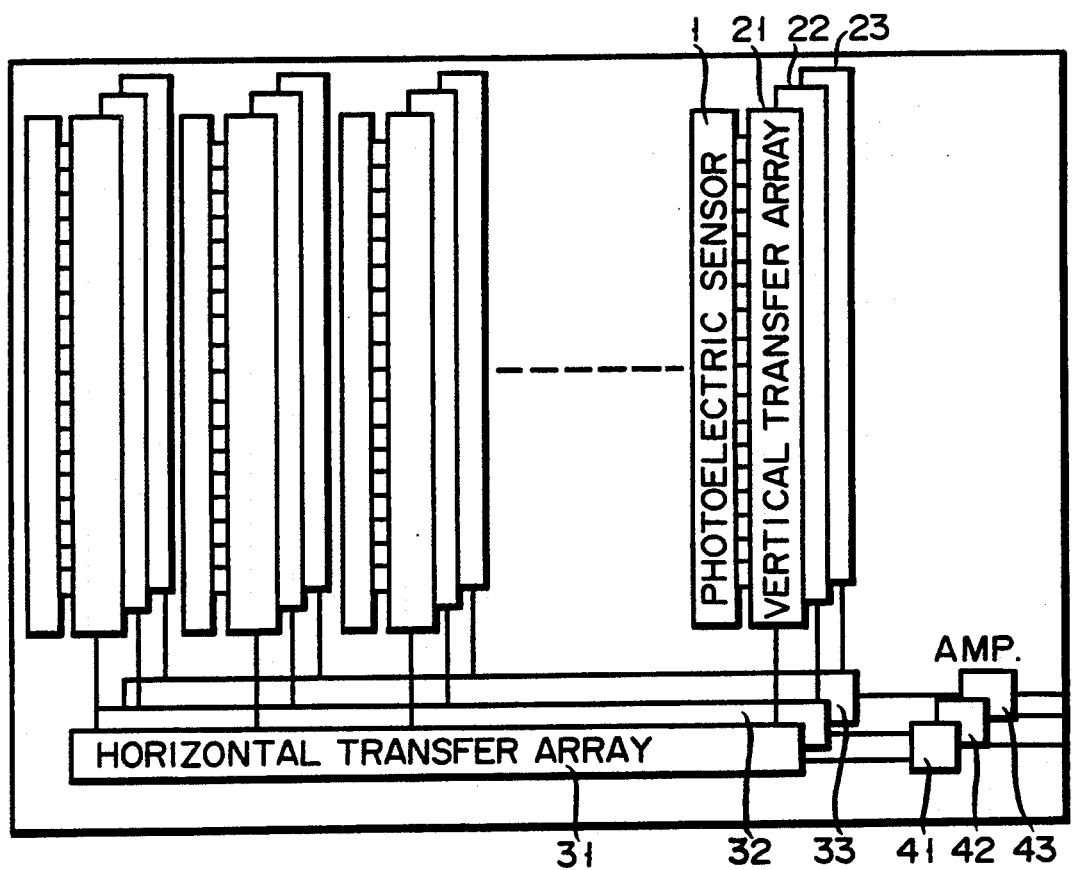
FIG. 1 shows an arrangement of a solid-state image sensing device embodying the present invention.

Referring now to FIG. 1, a solid-state image sensing device includes a plurality of photoelectric conversion members 1 which are disposed in parallel with each other. Each of photoelectric conversion members 1 is formed of a large number of photoelectric conversion elements vertically arranged, or an array of photoelectric elements and converts an incident optical image to photoelectric signals. A vertical transfer member 2 is disposed adjacent to and in parallel with each of photoelectric conversion members 1 in order to store and transfer the photoelectric signals. Vertical transfer member 2 is formed of, for example, three parallel vertical transfer arrays 21, 22 and 23 each of which is made of a charge transfer device such as a charge-coupled device (CCD). Each of the charge transfer devices is comprised of an array of a large number of elements which are connected to the respectively photoelectric elements of a corresponding photoelectric conversion member.

Outputs of vertical transfer members 2 are coupled to a horizontal transfer member 3 formed of three horizontal transfer arrays 31, 32 and 33 which correspond to vertical transfer arrays 21, 22 and 23, respectively. Each of the horizontal transfer arrays is formed of a charge transfer device, such as a CCD, having elements coupled to outputs of corresponding vertical transfer arrays, respectively. Outputs of horizontal transfer arrays 31, 32 and 33 are coupled to amplifiers 41, 42 and 43 in an amplifying section 4, respectively.

As described above, according to the solid-state image sensing device of the present invention, three transfer lines are provided for each of photoelectric conversion members 1; a first transfer system comprised of vertical transfer array 21, horizontal transfer array 31 and amplifier 41; a second transfer system comprised of vertical transfer array 22, horizontal transfer array 32 and amplifier 42; and a third transfer system comprised of vertical transfer array 23, horizontal transfer array 33 and amplifier 43.

The operation of the solid-state image sensing device will be described.

A light source adapted for emitting light of primary colors R, G and B is prepared. The first to third transfer systems are allocated for R, G and B, respectively. A subject is illustrated with the light source at short time intervals in the order of R, G and B. That is, the subject is first illuminated by red light for a short time, so that a red image of the subject is focused on the surface of photoelectric conversion member 1. At this time, the first transfer system (R system) is selected with the result that an R image signal output from photoelectric conversion member 1 is stored in vertical transfer array 21. Subsequently, the subject is illuminated by green light for a short time to focus a green image of the subject on the surface of photoelectric conversion member 1. At this time the second transfer system (G system) is selected so that a G image signal provided from photoelectric conversion member 1 is stored in vertical transfer array 22. Finally, the subject is illuminated by blue light for a short time and thus a blue image of the subject is focused on the surface of photoelectric conversion member 1. Since the third transfer system (B system) is selected, a B image signal output from photoelectric conversion member 1 is stored in vertical transfer array 23.

The R, G and B image signals stored in vertical transfer arrays 21, 22 and 23 are transferred to horizontal transfer arrays 31, 32 and 33, respectively, and stored therein. Horizontal transfer arrays 31, 32 and 33 then transfer the stored R, G and B image signals each for one scanning line to amplifiers 41, 42 and 43. Each of amplifiers 41, 42 and 43 amplifies an image signal applied thereto and feeds an amplified image signal to an external image processor. The external image processor synthesizes the R, G and B image signals to a color TV signal. The color TV signal is applied to a TV monitor for display of a color image of the subject.

In the image signal transfer scheme described above, the R, G and B signals need not be transferred simultaneously in transferring the R, G and B signals from vertical transfer arrays 21, 22 and 23 to horizontal transfer arrays 31, 32 and 33 and from horizontal transfer arrays 31, 32 and 33 to amplifiers 41, 42 and 43. For example, the transfer of the R image signal may be started when the next G image is taken. Alternatively, the R, G and B image signals may be sequentially transferred after the R, G and B images are all taken.

FIG. 2 illustrates an electronic endoscope apparatus using the solid-state image sensing device of the invention. According to the endoscope apparatus, a solid-state image sensing device 10 is attached to the tip portion of an endoscope 13. An illumination light source 12 is adapted for sequentially emitting R, G and B light. Light source 12 is coupled to optical fibres (not shown) incorporated into endoscope 13. By means of the optical fibres the illumination light of R, G and B is sequentially introduced to the interior of a body cavity for illumination thereof. Solid-state image sensing device 10 is coupled to R, G and B inputs of an analog-to-digital (A/D) converter 14 by the signal lines which are installed in endoscope 13 and coupled to amplifiers 41, 42 and 43. Outputs of A/D converter 14 are coupled to an image memory 15. Readout outputs of image memory 15 are coupled to inputs of a digital-to-analog (D/A) converter 16. An output of D/A converter 16 is coupled to a color TV monitor 17.

Illumination light source 12, A/D converter 14, image memory 15 and D/A converter 16 are coupled to a control circuit 11 constructed of a central processor unit (CPU) and the like. Control circuit 11 produces timing signals for switching the R, G, B light and timing signals for determining the timing to take the R, G, B images.

In operation of the endoscope apparatus of FIG. 2, illumination light source 12 sequentially, cyclically introduces the R, G, B light into the optical fibres in the endoscope to illuminate the interior of a body cavity with the R, G, B illumination light. The R, G and B images are taken by solid-state image sensing device 10 responding to driving signals provided from control circuit 11 in accordance with the timing shown i FIG. 3. That is, the R image is first converted to an R image signal within a short time by photoelectric conversion member 1 and stored in vertical transfer array 21 selected in response to a signal from control circuit 11. Next, the G image is taken and converted to a G image signal. Vertical transfer array 22 is selected in response to a signal from control circuit 11, so that the G image signal is stored in vertical transfer array 22. Similarly, the B image is taken and converted to a B image signal by photoelectric conversion member 1. The B image signal is stored in vertical transfer array 23 selected in response to a signal from control circuit 11.

Upon being stored in the R, G, B vertical transfer arrays, the R, G, B image signals are transferred to horizontal transfer arrays 31, 32, 33 in response to transfer signals from control circuit 11 in accordance with the timing shown in FIG. 3. The one-scanning-line R, G and B image signals transferred to horizontal transfer arrays 31, 32 and 33 are amplified by amplifiers 41, 42 and 43 and then applied to A/D converter 14 via the signal lines in the endoscope. After being converted to digital signals by A/D converter 14, the R, G and B image signals are stored in R, G and B frame memories, respectively, in image memory 15.

Figure 4:
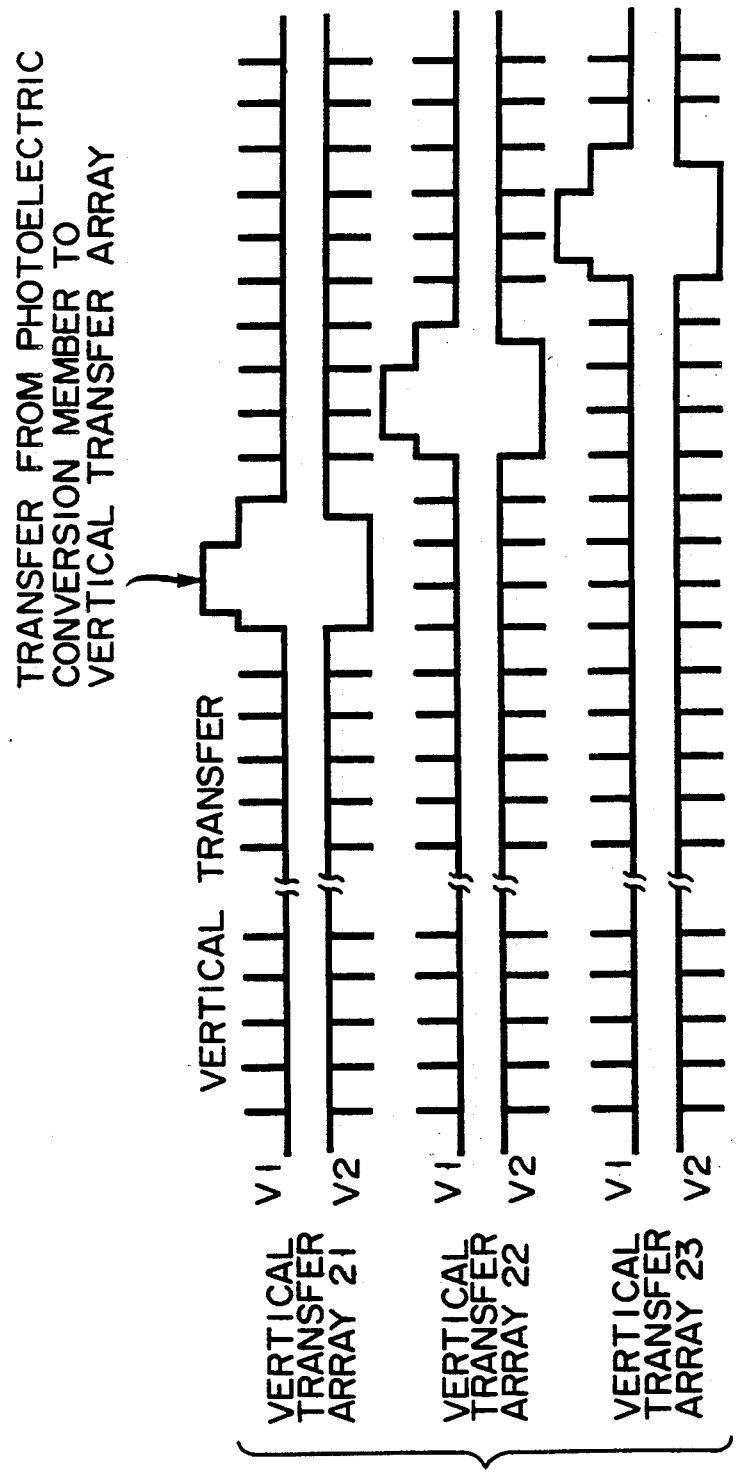
FIG. 4 is another timing diagram of the device of FIG. 2.

The image signals corresponding to three fundamental colors may be transferred according to the timing charts shown in FIG. 4.

The R, G and B image signals are read out of image memory 15 and then applied to D/A converter 16, which synthesizes the R, G and B image signals and converts a synthesized signal to an analog color TV signal. The color TV signal is applied to TV monitor 17 which visually displays the color TV signals as a color image.

According to the present invention, as described above, a plurality of image signal transfer systems are allotted for each of the photoelectric conversion members, and the transfer systems are allocated to image signals for fundamental colors used for a color image. The transfer systems store and transfer corresponding fundamental color image signals sequentially supplied within a short time. Accordingly, time difference among the R, G and B image signals will become very small, and color dislocations due to the synthesis of the R, G and B image signals will hardly be noticed. Further, since all the photoelectric elements in the solid-state image sensing device are used to produce one frame of the image, the resolution and the picture quality will not be degraded.

With the above-described embodiment, a combination of three reference colors of R, G and B are used to reproduce color images. Alternatively, a combination of cyan (Cy) and yellow (Ye) or a combination of Cy, Ye and G may be used.

What is claimed is:

1. A solid-state image sensing device comprising:
    a plurality of photoelectric conversion members disposed in parallel with each other for converting incident optical images to image signals;
    a plurality of vertical transfer members for storing image signals which are output from corresponding photoelectric conversion members and transferring the stored image signals in the vertical direction; and
    a plurality of horizontal transfer members coupled to said vertical transfer members for storing image signals transferred from vertical transfer members and transferring the stored image signals in the horizontal direction for each of scanning lines;
    wherein each of said photoelectric conversion members comprises a photoelectric image sensor for periodically and sequentially providing R, G and B image signals; each of said vertical transfer members comprises three vertical transfer arrays for storing R, G and B image signals, respectively, which are sequentially output from a corresponding photoelectric image sensor and transferring the stored image signals in the vertical direction; and said horizontal transfer members comprise three vertical transfer arrays for storing the R, G and B image signals, respectively, transferred from corresponding vertical transfer arrays and transferring the stored image signals in the horizontal direction.

2. A solid-state image sensing device for converting color optical images of a subject to color image signals, wherein each color optical image corresponds to one of a plurality of fundamental colors, and wherein each color image signal corresponds to one fundamental color, the sensing device comprising:
    a plurality of photoelectric conversion members disposed in parallel with each other, each photoelectric conversion member including:
        a plurality of photoelectric conversion elements, each photoelectric conversion element converting incident color optical images corresponding to the plurality of fundamental colors to color image signals corresponding to the plurality of fundamental colors, and outputting the color image signals;
    a plurality of vertical transfer members disposed in parallel with each other, each vertical transfer member connected to a corresponding photoelectric conversion member, and each vertical transfer member including:
        a plurality of vertical transfer arrays connected to the corresponding photoelectric conversion member, each vertical transfer array in the vertical transfer member corresponding to one fundamental color, and each vertical transfer array including:
            a plurality of vertical transfer elements, each vertical transfer element in the vertical transfer array connected to a corresponding photoelectric conversion element in the corresponding photoelectric conversion member, and each vertical transfer element in the vertical transfer array storing and transferring color image signals that are output by the corresponding photoelectric conversion element and that correspond to one fundamental color; and
    a horizontal transfer member not disposed in parallel with the vertical transfer members, the horizontal transfer member connected to each vertical transfer member, and the horizontal transfer member including:
        a plurality of horizontal transfer arrays, each horizontal transfer array corresponding to one fundamental color, each horizontal transfer array connected to a corresponding vertical transfer array in each vertical transfer member, and each horizontal transfer array including:
            a plurality of horizontal transfer elements, each horizontal transfer element in the horizontal transfer array connected to a corresponding vertical transfer element in one of the corresponding vertical transfer arrays, and each horizontal transfer element in the horizontal transfer array storing and transferring color image signals that correspond to one fundamental color.

3. A solid-state image sensing device in accordance with claim 2, in which each vertical transfer array and each horizontal transfer array is a charge-coupled device.

4. A solid-state image sensing device in accordance with claim 2, in which the plurality of fundamental colors are red, green, and blue, in which each vertical transfer member includes three vertical transfer arrays, and in which the horizontal transfer member includes three horizontal transfer arrays.

5. A solid-state image sensing device in accordance with claim 2, in which the plurality of fundamental colors are cyan, yellow, and green, in which each vertical transfer member includes three vertical transfer arrays, and in which the horizontal transfer member includes three horizontal transfer arrays.

6. A solid-state image sensing device in accordance with claim 2, and further comprising:
    light source means for sequentially and cyclically emitting light corresponding to each of the plurality of fundamental colors to illuminate the subject; and
    wherein each photoelectric conversion element sequentially and cyclically converts incident color optical images corresponding to each of the plurality of fundamental colors to color image signals corresponding to each of the plurality of fundamental colors, and sequentially and cyclically outputs the color image signals corresponding to each of the plurality of fundamental colors.

7. A solid-state image sensing device in accordance with claim 6, and further comprising:
    control means connected to each vertical transfer array for sequentially and cyclically providing a plurality of driving signals, each driving signal corresponding to one fundamental color; and
    wherein the vertical transfer arrays corresponding to one fundamental color are selected in response to providing by the control means of the corresponding driving signal; and wherein the vertical transfer elements in the selected vertical transfer arrays store color image signals corresponding to the one fundamental color in response to providing by the control means of the corresponding driving signal.

8. A solid-state image sensing device in accordance with claim 7, in which:
   the control means provides a plurality of transfer signals, each transfer signal corresponding to one fundamental color;
   the vertical transfer arrays corresponding to one fundamental color are selected in response to providing by the control means of the corresponding transfer signal; and
   the vertical transfer elements in the selected vertical transfer arrays transfer color image signals corresponding to the one fundamental color in response to providing by the control means of the corresponding transfer signal.

9. A solid-state image sensing device in accordance with claim 8, in which the control means sequentially and cyclically provides the transfer signals corresponding to the fundamental colors.

10. A solid-state image sensing device in accordance with claim 8, in which the control means simultaneously provides the transfer signals corresponding to the fundamental colors.

11. A solid-state image sensing device in accordance with claim 2, wherein the image sensing device is used in an endoscope and the subject is a body cavity, and further comprising:
    light source means for sequentially and cyclically emitting light corresponding to each of the plurality of fundamental colors to illuminate the interior of the body cavity; and
    wherein each photoelectric conversion element sequentially and cyclically converts incident color optical images corresponding to each of the plurality of fundamental colors to color image signals corresponding to each of the plurality of fundamental colors, and sequentially and cyclically outputs the color image signals corresponding to each of the plurality of fundamental colors.

12. A solid-state image sensing device in accordance with claim 11, in which each vertical transfer array and each horizontal transfer array is a charge-coupled device.

13. A solid-state image sensing device in accordance with claim 11, in which the plurality of fundamental colors are red, green, and blue, in which each vertical transfer member includes three vertical transfer arrays, and in which the horizontal transfer member includes three horizontal transfer arrays.

14. A solid-state image sensing device in accordance with claim 11, in which the plurality of fundamental colors are cyan, yellow, and green, in which each vertical transfer member includes three vertical transfer arrays, and in which the horizontal transfer member includes three horizontal transfer arrays.

15. A solid-state image sensing device in accordance with claim 11, and further comprising:
    control means connected to each vertical transfer array for sequentially and cyclically providing a plurality of driving signals, each driving signal corresponding to one fundamental color; and
    wherein the vertical transfer arrays corresponding to one fundamental color are selected in response to providing by the control means of the corresponding driving signal; and
    wherein the vertical transfer elements in the selected vertical transfer arrays store color image signals corresponding to the one fundamental color in response to providing by the control means of the corresponding driving signal.

16. A solid-state image sensing device in accordance with claim 15, in which:
    the control means provides a plurality of transfer signals, each transfer signal corresponding to one fundamental color;
    the vertical transfer arrays corresponding to one fundamental color are selected in response to providing by the control means of the corresponding transfer signal; and
    the vertical transfer elements in the selected vertical transfer arrays transfer color image signals corresponding to the one fundamental color in response to providing by the control means of the corresponding transfer signal.

17. A solid-state image sensing device in accordance with claim 16, in which the control means sequentially and cyclically provides the transfer signals corresponding to the fundamental colors.

18. A solid-state image sensing device in accordance with claim 16, in which the control means simultaneously provides the transfer signals corresponding to the fundamental colors.

19. A solid-state image sensing device comprising:
    a plurality of photoelectric conversion members disposed in parallel with each other for converting incident optical images to image signals; and
    a plurality of transfer members provided for each of said photoelectric conversion members in correspondence with a plurality of fundamental colors, said transfer members storing and transferring the image signals corresponding tot he fundamental colors, which are supplied from said photoelectric conversion members;
    wherein each of said photoelectric conversion members includes a photoelectric image sensor for sequentially providing R, G and B image signals; said transfer members include a plurality of vertical transfer arrays, provided for each of photoelectric image sensors, for storing the R, G and B image signals, respectively, which are sequentially output from a corresponding photoelectric image sensor and transferring the stored image signals in the vertical direction; and a plurality of horizontal transfer arrays coupled to said plurality of vertical transfer arrays, respectively, for storing image signals from said vertical transfer arrays and transferring the stored image signals in the horizontal direction.

* * * * *